(No Model.) 5 Sheets—Sheet 5.
J. MOFFAT & W. W. VIRTUE.
ANIMAL SHEARS.
No. 494,070. Patented Mar. 21, 1893.
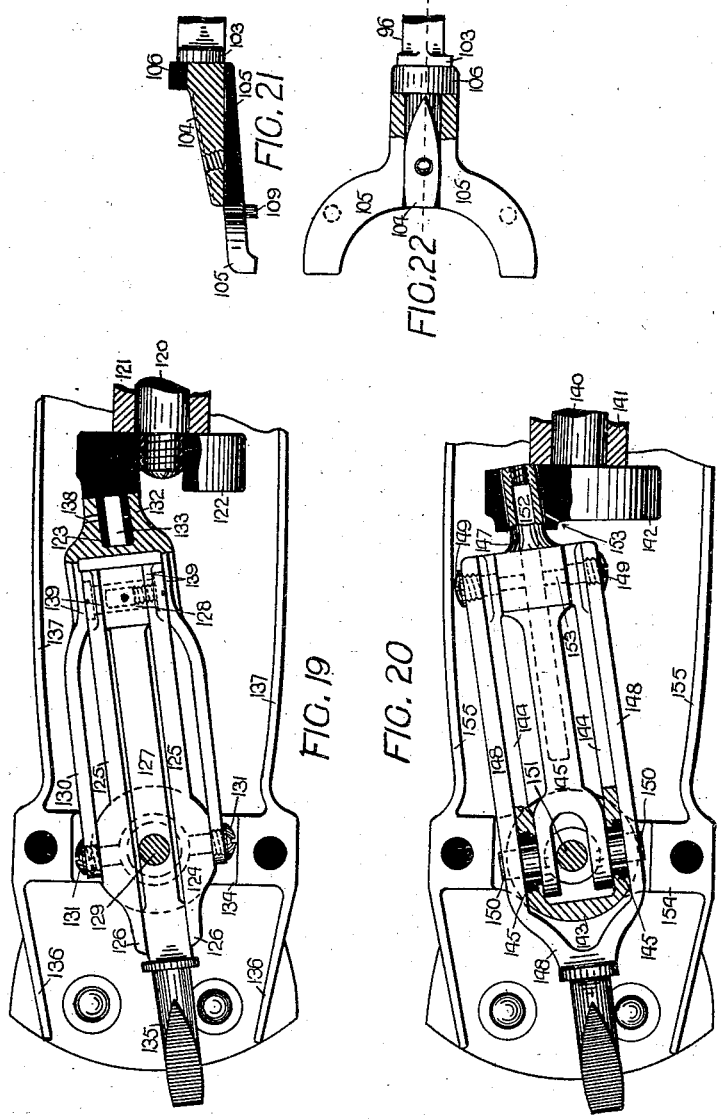

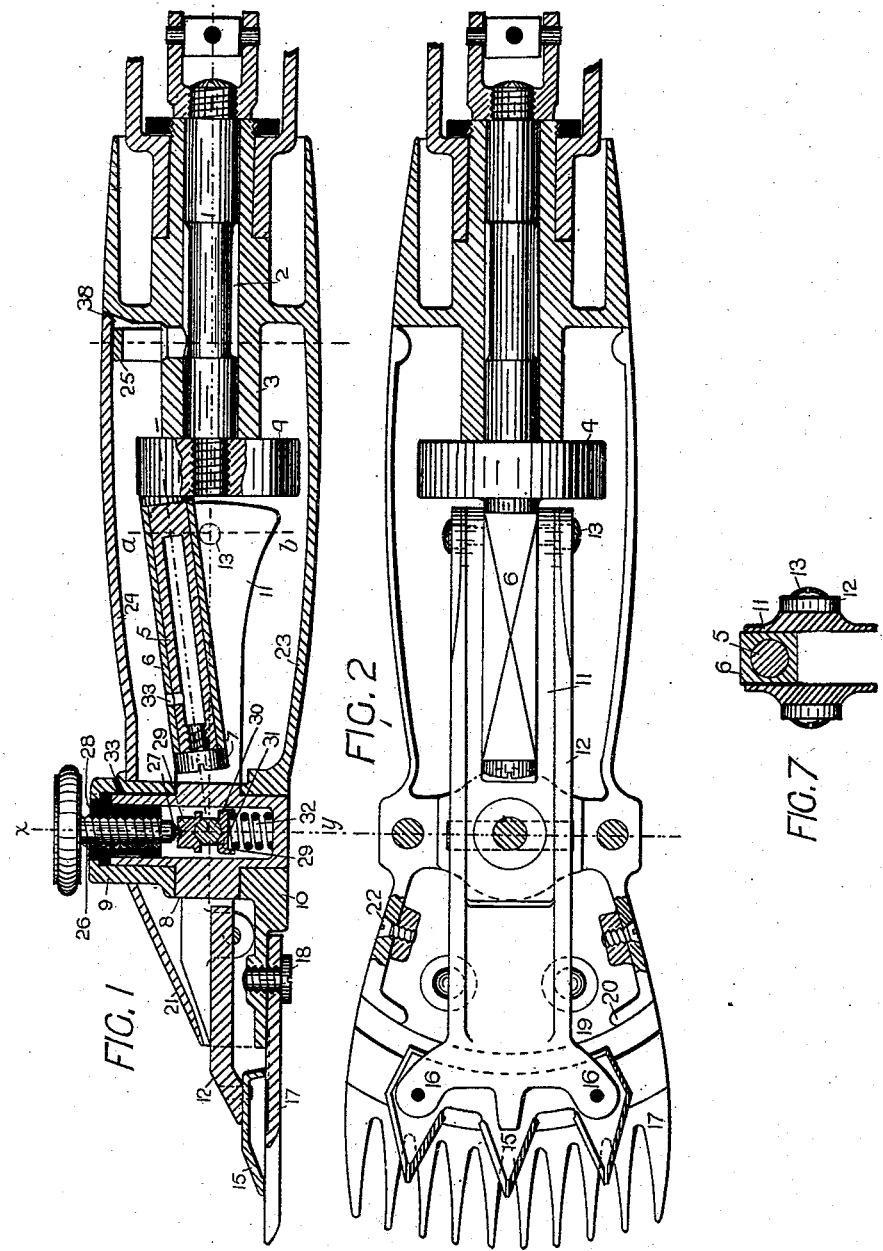

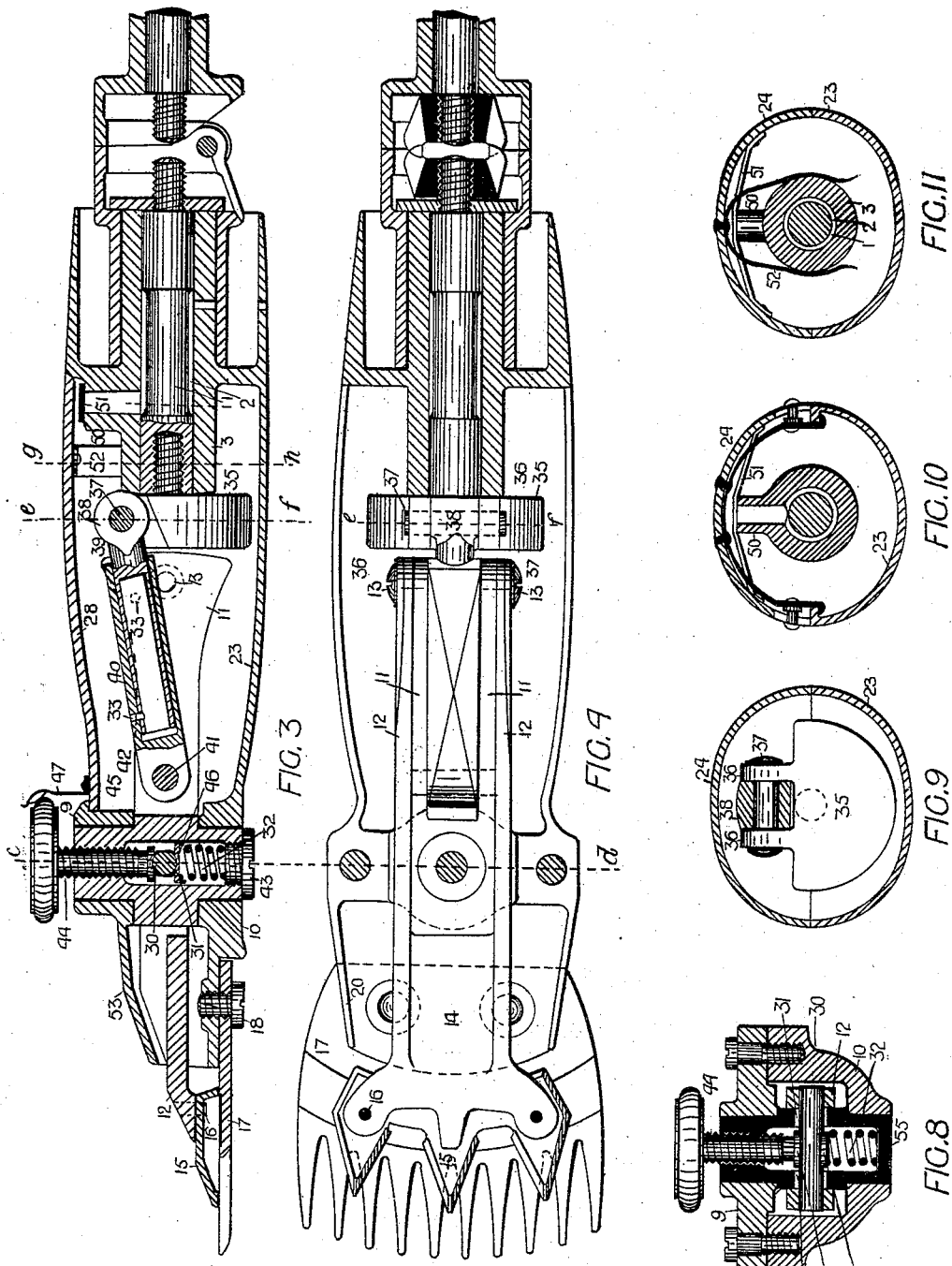

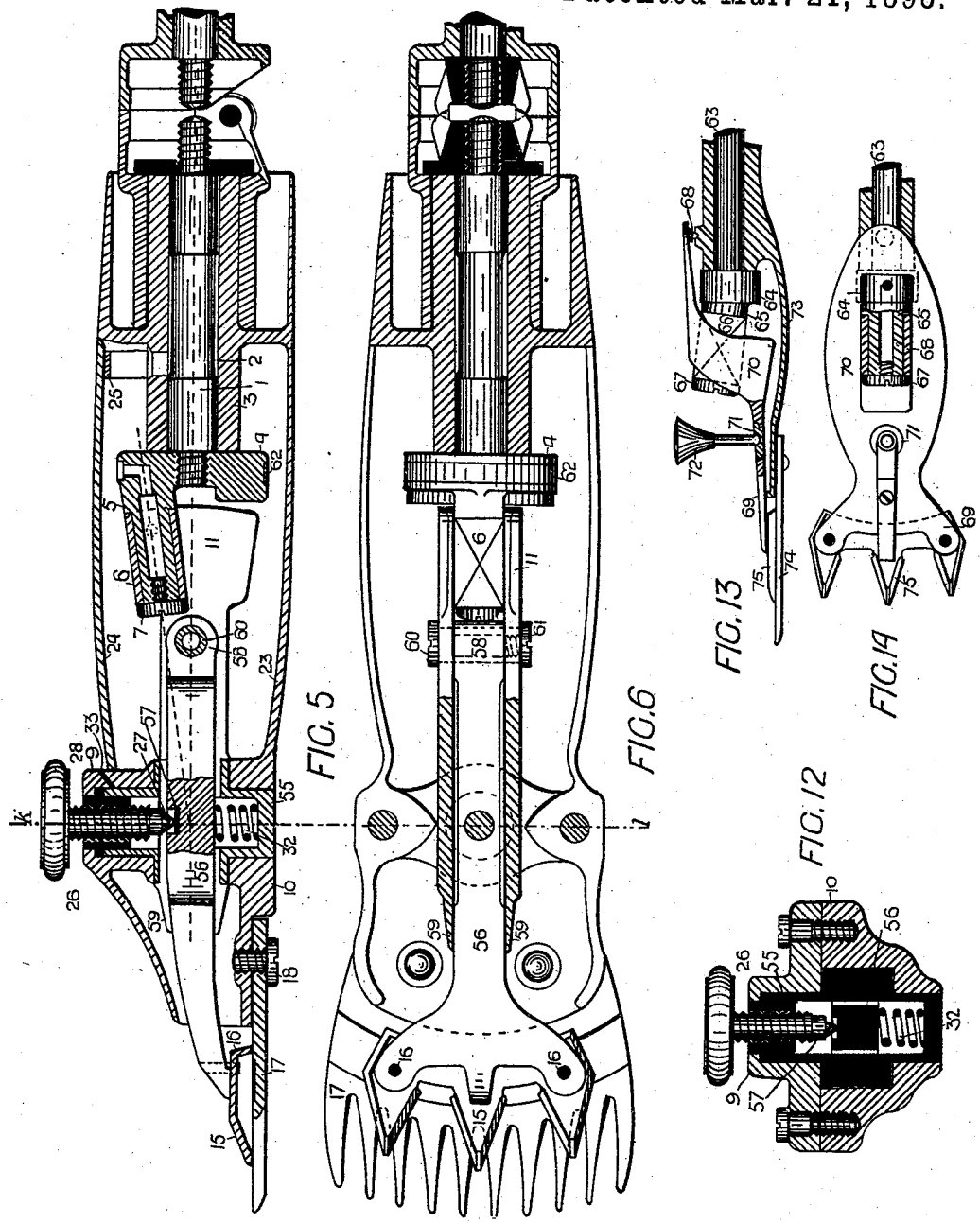

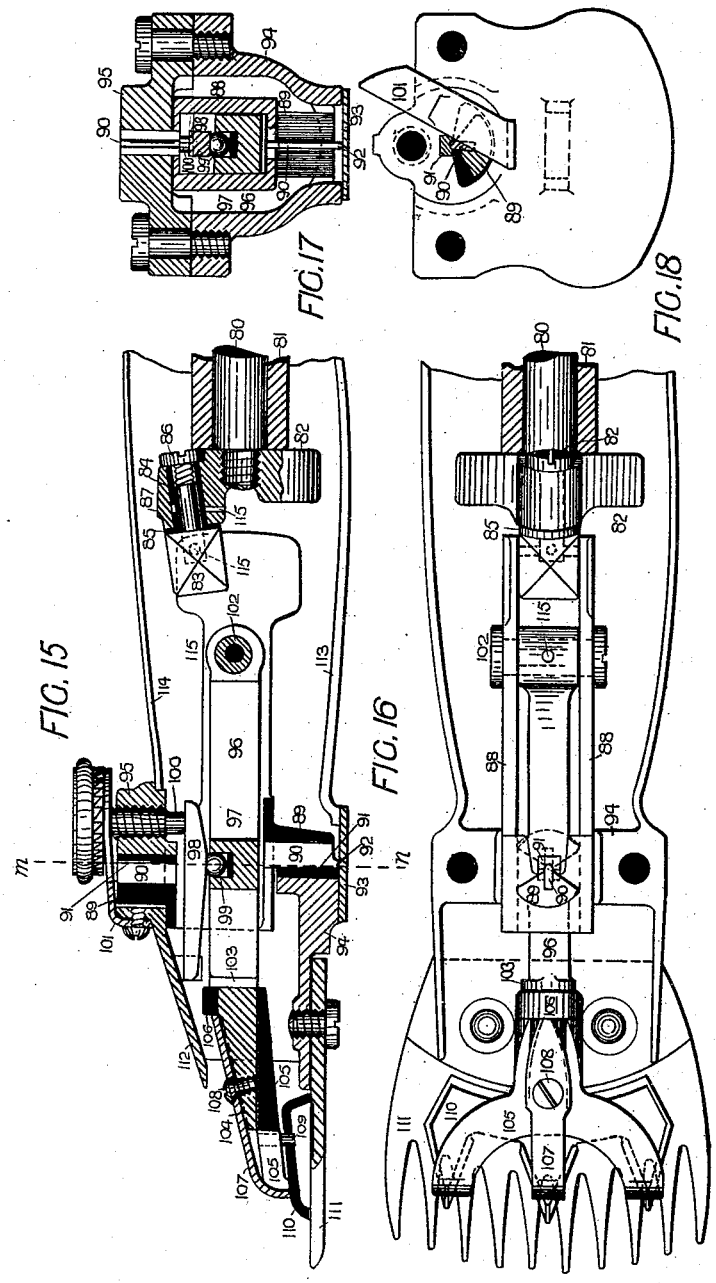

UNITED STATES PATENT OFFICE.

JOHN MOFFAT AND WILLIAM W. VIRTUE, OF SYDNEY, NEW SOUTH WALES.

ANIMAL-SHEARS.

SPECIFICATION forming part of Letters Patent No. 494,070, dated March 21, 1893.

Application filed December 31, 1891. Serial No. 416,642. (No model.)

*To all whom it may concern:*

Be it known that we, JOHN MOFFAT and WILLIAM WRIGHT VIRTUE, subjects of the Queen of Great Britain, residing at Sydney, in the Colony of New South Wales, have invented certain new and useful Improvements in Machines for Shearing and Clipping Wool and for Cutting Hair, of which the following is a specification.

Our invention relates to improvements in that class of machines known as "horse clippers" or sheep shearing machines, in which a knife or cutter is reciprocated over a comb or gathering plate, the reciprocating motion being derived through suitable converting mechanism from a rotating shaft.

The objects of this invention are to provide improved mechanism for converting rotary motion into reciprocating motion; to provide machines of the class above named with tension devices which may be operated without affecting the plane of vibration of the machine and to generally improve the details of the machine, facilitate its adjustments, and insure its effective operation.

The invention consists in the combination in a shearing or clipping machine of a power lever; a knife or cutter bar having its fulcrum on the driven end of said lever; and tension mechanism for varying the position of the forward end of the cutter bar perpendicularly to the plane of vibration.

The invention consists further in the combination in a shearing or clipping machine, of a cutter bar and comb, a driving or power lever with which the cutter bar is connected, a balanced disk carried by a rotating shaft, and an overhung pin or spindle operating said power lever, said pin and rotary shaft being so arranged relatively that if their axes were produced they would intersect at the axis of vibration of the machine.

The invention consists further in the combination in a shearing or clipping machine of a cutter-bar, a reciprocating lever; means for operating the latter from a rotary shaft, and mechanism for tensioning the cutters independently of the reciprocating lever.

The invention also consists in the various features of construction, combinations and relative arrangements of devices fully described hereinafter and specified in the appended claims.

In the accompanying drawings, Figure 1 is a central longitudinal section of a machine embodying our invention. Fig. 2 is a plan view of the same, with the top of the casing removed. Fig. 3 is a central longitudinal section of a modification of the machine. Fig. 4 is a plan view of Fig. 3. Figs. 5 and 6 are respectively a longitudinal section and a plan view of a third modification. Fig. 7 is a transverse section on the line *a—b* of Fig. 1. Fig. 8 is a transverse section on the line *c—d* of Figs. 3 and 4. Fig. 9 is a transverse section on the line *e—f* of Figs. 3 and 4. Fig. 10 is a transverse section illustrating means for securing the cover of the machine casing, and capping the main oil opening. Fig. 11 is a section on the line *g—h* of Fig. 3. Fig. 12 is a section on the line *k—l* of Figs. 5 and 6. Fig. 13 is a sectional view of a form of machine to which one of the novel features of our machine is applicable. Fig. 14 is a plan view partly in section of the device shown in Fig. 13. Figs. 15 and 16 are respectively a longitudinal central section and a plan view of a fourth modification of the machine shown in Figs. 1 and 2. Fig. 17 is a section taken on the line *m—n* of Fig. 15. Fig. 18 represents a detached part of the machine shown in Figs. 15 and 16. Figs. 19 and 20 are respectively views (partly plan and partly in section) of a fifth and sixth modification of the general construction of the machine, and Figs. 21 and 22 illustrate detached parts of the construction shown in Figs. 15 and 16.

Referring particularly to Figs. 1, 2 and 7, the numeral 1 indicates the main shaft of the machine provided at its outer end with any preferred coupling for the attachment of a flexible shaft from which rotary motion may be derived, and formed with an annular oil chamber 2.

3 indicates the main bearing of the shaft, and 4 a balanced disk or coupling secured upon the inner end of the shaft and provided with an overhung eccentric pin or spindle 5, which is preferably cored out to form an oil reservoir. A bushing 6 is fitted upon the spindle 5 and secured thereto by a screw plug 7 which enters the inner end of the spindle, the latter being interiorly threaded to receive it. The bushing 6 is formed square on its exterior to adapt it to fit between the forks 11 of the center block.

The casing of the machine inclosing the parts above described, consists of the shell 23 lower lip 19, upper lip 21 and removable cover 24. The shell 23 is formed with a seat or bearing 10 to receive the lower end of the oscillating center block 8, the upper end of which bears within a sleeve or upper bearing 9 secured to the casing by screws 9$^\times$. This block 8 is hollow as clearly shown in Fig. 1, and within it are arranged the tension devices consisting of a screw 26 provided with a hand wheel 26$^\times$ at its upper end and with a hardened conical point at its lower end; a thimble 29 supported in the bearing 9; a bridge pin 30; a coil spring 32; a washer 29 interposed between the upper end of the spring 32 and the bridge pin 30, and a washer 29$^\times$ between the bridge pin 30 and the lower end of the screw 26. The center block 8 is provided with two parallel wings 11 preferably formed integral therewith, and extending rearwardly to a point near the disk 4 as shown. The cutter bar is provided with parallel arms 12 fitting around the center block 8 and its wings 11, and pivotally secured to the rear ends of the latter by bolts or pivots 13 which pass through the rear ends of said wings 11 and parallel arms 12. These arms 12 are connected at their forward ends by a web 14 formed with fingers 14$^\times$ to which the cutter plate 15 is secured by pins 16.

17 indicates the comb or gathering plate secured to the lower lip 19 of the machine by screws 18.

The center block 8 is formed on opposite sides with slots 31 through which the ends of the bridge-pin 30 project, to enter openings in the arms 12 as shown by dotted lines in Fig. 2.

Oil openings 33 are formed in the bushing 6 and bearing 9.

The axes of the shaft 1 and spindle 5 if projected forward would intersect each other in the axis of vibration of the block 8 as indicated by dotted lines.

The operation of the machine as thus constructed is as follows:—The rotation of the shaft 1 will cause the bushing 6 carried by the spindle 5, to move vertically between the wings 11 of the cutter bar, thus imparting a vibrating reciprocating movement to said wings, and to the cutter bar through its arms 12. The cutter plate is tensioned by the screw 26. The thimble 28 is formed with a square head so that it will lock itself within the upper bearing 9 and not turn with the block 8. The thimble is interiorly threaded to receive the screw 26, and hence the tension may be varied if desired while the machine is in motion. The cover 24 of the casing may be secured in any preferred manner, but we prefer to secure it at its rear end by a clasp spring 25 secured to the cover and embracing the shaft bearing 3 (see Figs. 1, 3 and 11) while its forward end takes under a lug 24$^\times$ projecting from the bearing 9.

In Fig. 11 we show a leather cap 50 secured to a spring bridge-piece 51 and adapted to close the main oil opening for the shaft 1.

While the foregoing description covers one form of mechanism in which our invention may be embodied, it is obvious that numerous changes in the form of the several elements of our machine and also in their relative arrangement may be resorted to without departing from the scope of our invention, and we have therefore illustrated in the drawings a number of modified constructions, all of which are comprehended in the appended claims, and will now briefly refer to each of them pointing out the differences between them and the construction illustrated in Figs. 1 and 2, and above described.

In Figs. 3, 4, 8 and 9 we show a machine in which the thimble 28 of Figs. 1 and 2 is omitted and the center block 8$^\times$ extended upwardly and tapped to receive the tension screw 26$^\times$. The lower end of this screw is formed without a conical point, and rests upon a flat washer. The bearing 10 is open at its lower end and supplied with a screw plug 43. In this construction the screw and its hand wheel move with the center block, and hence a hand-guard 47 is secured to the cover 24 and extended upwardly over the wheel. In this modification also, a change is made in the mechanism for converting the rotary motion into reciprocating motion, as follows:—The disk 4$^\times$ is formed with cheeks 36 between which the spindle 5$^\times$ is pivotally secured by a pin 37 passing through openings in the cheeks 36, and through an eye-head 38 formed in the spindle 5$^\times$. The forward end of the bushing 6$^\times$ is extended and pivoted between the wings 11 of the center block by a pin 41. The operation of this construction is substantially the same as that of the first described form of machine. The bushing 6$^\times$ reciprocates vertically about the pin 41, while within said bushing the spindle 5$^\times$ rotates and also reciprocates with the bushing, and has a slight pivotal movement on the pin 37.

In Figs. 5, 6 and 12 we illustrate another modification in which the center block is formed with a rectangular through opening 55; forwardly projecting arms 59, and rearwardly extending wings 11$^\times$. The cutter bar is not bifurcated as in Figs. 1, 2, 3 and 4, but consists of a single piece which extends through the aperture 55 of the center block and is secured to the wings 11$^\times$ by a hollow pin 60 and a nut 61. The tension screw 26 rests on a shoe 57 set in a suitable slot formed in the cutter bar as clearly seen in Fig. 5. The devices for converting motion are the same as those shown in Fig. 1 except that in this instance we provide the disk 4 with a sliding spring 62 of open-ring form to close the oil opening in the disk.

In lieu of the means shown in Fig. 11 for securing the cover 24, the devices shown in Fig. 10 may be employed. These consist of a spring $52^x$ secured to the inner side of the cover and formed with hooked ends $52^a$ to engage lugs $52^b$ formed on opposite sides of the casing 23. Adjacent to the hooked ends of the spring, headed pins $52^c$ are secured to the spring to project through slots in the cover. By pressing these pins inwardly the hooks of the spring are disengaged from their lugs as will be readily understood.

In Figs. 13 and 14, our improved power transmitting mechanism is shown applied to a form of machine in common use. In these figures $1^a$ indicates the main shaft, $4^a$ the disk, $5^a$ the eccentric spindle; $6^a$ the bushing secured upon the spindle by a nut $7^a$. The cutter bar is formed with wings 70 between which the bushing $6^a$ operates and the rear end of said bar is pivoted upon the casing at the point 68. A tension screw 72 extends through the nose-cover (not shown) to bear upon the cutter bar. Heretofore in machines of the class shown in Figs. 13 and 14 a roller overhung eccentrically from a disk has been used to reciprocate the cutter bar, but such a device causes rattling and loose working of the parts, defects which our construction avoids.

Figs. 15, 16, 17, 18, 21 and 22 are views of a form of our machine in which the vibrating center block is provided with knife bearings, and the power transmitting and tension devices are varied from those shown in the other figures.

$1^b$ indicates the main shaft, $3^b$ its bearing and $4^b$ is the rotating balanced disk. The disk is enlarged at the point 82 and formed with a bored bearing 84, to receive the hollow spindle 85 of a motion block 83, which is held in operative connection with the disk by a screw-plug 86. The motion block 83 operates between the parallel wings $11^c$ of the power lever. Instead of the form of center block shown in Figs. 1 and 2 we employ in this construction a center block 86 having two oppositely arranged cross-heads 89, each of which is provided with a knife plate 90, adapted to bear against hardened plates 93 secured within the bearings of the center block. The cutter bar in this instance is not bifurcated, and extends rearwardly through the center block, and is secured pivotally to the wings $11^c$ by means of a cross pin 102 passing through the wings and through an eye-head formed on the end of the cutter bar. The cutter bar in this modification serves also as the tension lever, but as the construction of the center block is such that the tension screw $26^d$ cannot bear directly on the shoe $57^b$ of said cutter bar, we employ an intermediate lever 98 having a ball or conical bearing 99 and arranged between the cutter bar and tension screw. The forward end of this lever 98 is supported in a step or bracket $98^x$ of the nose-cover 112, while its rear end receives the contact of the tension screw.

101 indicates a tension locking spring secured at one end to the upper bearing $9^c$ and bent at its other end to form a pawl to take into teeth formed around the lower edge of the hand wheel $26^c$ of the tension screw.

The cutter bar is formed with a shoulder 103, and is inclined at its front end at the point 104, and upon this inclined surface rests a spring claw 107 held by a screw 108. A tension distributing fork 105 provided with an integral ring 106 embraces the forward end of the cutter bar and has a limited movement thereon to adjust itself to the plane of the upper surface of the knives and thus equally distribute the tension thereon.

Referring to Fig. 19, $1^d$ is the main shaft, and $3^d$ its bearing. $4^d$ indicates the balanced disk formed with a hollow eccentric spindle $5^d$. $8^d$ is the center block provided with forwardly extending arms 126 and rearwardly projecting wings $11^d$. 127 indicates the tension lever provided at its rear end with an eye-head secured pivotally to the wings of the center block by a pin 128. 129 indicates a bearing shoe on the tension lever to receive the tension screw. 130 denotes a forked link or connecting bar secured pivotally to the center block by screws 131. The rear end of the link 130 is bored to receive the hollow spindle of the rotating disk. In this construction the motion is converted from rotary to reciprocating by the action of the overhung spindle $5^d$ and the forked link 130. The spindle is turned on a center which if produced would cut the axis of vibration at its point of intersection with the centers of the pins 131. It is hollow to form within it an oil chamber 33 and to reduce its weight.

In Fig. 20, $1^e$ is the main shaft, $3^e$ its bearing; $4^e$ is the balanced disk, $8^e$ is the center block having rearward extensions $11^e$ and hollow screws 145, to receive the eyes of an eccentric driving lever 146, having a turned head 147 to enter a corresponding opening in the disk $4^e$. 148 indicates a forked tension lever secured by screws 149 to the wings $11^e$ of the center block. The motion bar 146 moves in sliding contact with the wings $11^e$ of the center block to reciprocate the latter. $30^e$ indicates the tension bridge-pin, and $26^e$ the tension screw. The operation of this last described construction will be apparent. The peculiar form and arrangement of the balanced disk and its overhung pin or spindle, common to all of the forms of machine above described not only affords a positive reciprocation of the cutting knives, but also prevents rattling and loose motion of the parts.

If desired ball bearings may be provided between the center block 8 and its supports to reduce the friction.

The knife bearings of the center block shown in Figs. 15 and 16 add to the speed and ease of operation of the cutters as well as to the durability of the machine.

The tension devices are practically independent of the operating mechanism, and the cutters therefore may be readily adjusted without liability of disarranging or throwing the working parts of the machine out of operative position.

Having fully described our invention, what we claim as new, and desire to secure by Letters Patent of the United States, is—

1. The combination in a shearing or clipping machine, of a cutter bar and comb, a driving or power lever with which the cutter bar is connected; a balanced disk carried by a rotating shaft; and an overhung pin or spindle operating said lever, said pin and rotary shaft being so arranged relatively that if their axes were produced, they would intersect at the axis of vibration of the machine, substantially as described.

2. The combination in a shearing or clipping machine, of a vibrating lever, provided with parallel wings or arms; a rotating disk, a hollow spindle projecting eccentrically from said disk, a bushing surrounding said spindle, and moving between said wings or arms, substantially as described.

3. The combination in a shearing or clipping machine, of a vibrating lever, provided with parallel wings or arms, of a rotating disk; a hollow spindle projecting eccentrically from said disk, a bushing surrounding said spindle, and a screw-plug for closing the end of the spindle and securing the bushing in place, substantially as described.

4. The combination with the cutter bar, comb, and casing, of a center block oscillating in bearings supported in the casing and provided with rearwardly extending wings, the vibrating cutter bar pivotally secured to said wings, and means for reciprocating the wings, substantially as described.

5. The combination with the cutter bar, comb, and casing of a hollow center block oscillating in bearings supported in the casing and provided with rearwardly projecting wings, the vibrating cutter bar pivotally secured at its rear end to the wings, means for reciprocating the wings, and tension devices arranged within the center block for depressing the cutter bar, substantially as described.

6. In a shearing or clipping machine, the combination with an inclosing casing or shell, of a stationary comb or gathering-plate; a vibrating cutter bar carrying knives; a hollow center block provided with wings to which the cutter bar is secured; tension devices arranged within the center block, and a thimble for supporting the tension screw, substantially as described.

7. The combination with the casing and stationary gathering-plate, of an upper and a lower bearing in the casing, a center block supported in said bearings and having rearwardly extending wings; a bifurcated cutter bar, embracing said center block and its wings and pivotally secured to the latter; means for reciprocating the cutter bar; a bridge pin and screw for tensioning the cutter bar and a spring arranged below the bridge-pin within the center-block, substantially as described.

8. In a shearing or clipping machine, the combination with the casing and its upper and lower bearings, of a center block supported in said bearings and provided with projecting wings; a reciprocating cutter bar, and an eccentric pin or spindle projecting from a rotating disk between the wings of the center block, substantially as described.

9. The combination with the machine casing, of a cover, and a spring secured to the inner side thereof for removably securing the cover in place, substantially as described.

10. In a shearing machine, the combination with the cutter bar, comb and casing, of a hollow center block oscillating in bearings supported in the casing and provided with projecting wings, a spring supporting said cutter bar on said center block, a screw for regulating the tension of said spring, and means for reciprocating said wings, substantially as described.

11. In a shearing machine, the combination with an inclosing casing or shell, of a comb plate, a hollow center block provided with wings, tension devices arranged within said hollow center block, a vibrating cutter bar connected to said tension devices and pivotally secured to said wings, and means for reciprocating said wings, substantially as described.

12. In a shearing machine, the combination with the comb-plate and casing, of the center block mounted in bearings in said casing and provided with wings, the cutter bar carrying knives and pivotally secured to said wings, the drive shaft and balanced disk, and the hollow spindle carried by the disk and provided with a bushing, the said hollow spindle and bushing having oil openings, substantially as described.

13. In a shearing machine the combination with the comb-plate and casing, of a center block supported in bearings in said casing and having rearwardly extending wings a bifurcated cutter bar embracing said center block and its wings and pivotally secured to the latter, a bridge pin passing through openings formed in the center block and the sides of the cutter bar, washers arranged above and below said bridge pin, a tension screw and spring respectively bearing against said washers, and means for reciprocating the cutter bar, substantially as described.

14. In a shearing machine, the combination with the comb-plate and casing, of a hollow center block mounted in bearings in the casing and provided with rearwardly extending wings, the cutter bar carrying knives, bolts pivotally connecting said cutter bar to the wings, a disk and spindle for reciprocating said wings, and mechanism arranged in said hollow center block for vertically adjusting said cutter about its pivot bolts, substantially as described.

JOHN MOFFAT.
WILLIAM W. VIRTUE.

Witnesses:
W. J. SPRUSON,
W. J. DAVIS.